United States Patent
Daly et al.

(10) Patent No.: US 10,176,010 B2
(45) Date of Patent: *Jan. 8, 2019

(54) ACTIVITY INITIATED VIRTUAL MACHINE MIGRATION

(71) Applicant: Excalibur IP, LLC, New York, NY (US)

(72) Inventors: Tim Daly, San Jose, CA (US); Jeff Budzinski, San Jose, CA (US); Annie Cheng, Milpitas, CA (US)

(73) Assignee: Excalibur IP, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,936

(22) Filed: Aug. 7, 2017

(65) Prior Publication Data

US 2017/0337078 A1 Nov. 23, 2017

Related U.S. Application Data

(63) Continuation of application No. 13/844,711, filed on Mar. 15, 2013, now Pat. No. 9,760,389.

(51) Int. Cl.
*G06F 9/455* (2018.01)

(52) U.S. Cl.
CPC .. *G06F 9/45558* (2013.01); *G06F 2009/4557* (2013.01); *G06F 2009/45575* (2013.01); *G06F 2009/45591* (2013.01)

(58) Field of Classification Search
CPC ........... G06F 2009/4557; G06F 9/4856; G06F 9/5094; G06F 9/45533; G06F 1/3203; G06F 2201/81; G06F 3/0647
See application file for complete search history.

(56) References Cited

U.S. PATENT DOCUMENTS

| | | | | |
|---|---|---|---|---|
| 8,065,676 B1* | 11/2011 | Sahai | ............. | G06F 9/5077 709/226 |
| 8,396,986 B2* | 3/2013 | Kanada | ............. | G06F 9/4856 709/238 |
| 2002/0108064 A1* | 8/2002 | Nunally | ............. | G06F 1/3203 713/300 |
| 2008/0250415 A1* | 10/2008 | Illikkal | ............. | G06F 9/5077 718/103 |
| 2008/0320269 A1* | 12/2008 | Houlihan | ............. | G06F 9/4856 711/203 |
| 2009/0106571 A1* | 4/2009 | Low | ............. | G06F 9/4856 713/310 |
| 2010/0037038 A1* | 2/2010 | Bieswanger | ............. | G06F 1/3203 712/220 |
| 2010/0115509 A1* | 5/2010 | Kern | ............. | G06F 1/3203 718/1 |
| 2010/0299130 A1* | 11/2010 | Mitsuzawa | ............. | G06F 9/4856 703/26 |

(Continued)

OTHER PUBLICATIONS

U.S. Appl. No. 13/844,711, filed Mar. 15, 2013, 50 pages.

(Continued)

*Primary Examiner* — Dong U Kim
(74) *Attorney, Agent, or Firm* — Berkeley Law & Technology Group, LLP

(57) ABSTRACT

Briefly, embodiments of methods or systems for activity initiated virtual machine migration are disclosed.

20 Claims, 3 Drawing Sheets

(56) References Cited

U.S. PATENT DOCUMENTS

| | | | | |
|---|---|---|---|---|
| 2011/0022861 A1* | 1/2011 | Agneeswaran | ....... | G06F 1/3203 713/310 |
| 2011/0066597 A1* | 3/2011 | Mashtizadeh | ......... | G06F 3/0617 707/640 |
| 2011/0161695 A1* | 6/2011 | Okita | .................... | G06F 1/3209 713/310 |
| 2011/0239010 A1* | 9/2011 | Jain | ...................... | G06F 1/3209 713/310 |
| 2012/0221699 A1* | 8/2012 | Moriyasu | .............. | G06F 9/5077 709/223 |
| 2013/0054813 A1* | 2/2013 | Bercovici | ............. | G06F 9/4856 709/226 |
| 2013/0145365 A1* | 6/2013 | Yang | .................. | G06F 9/45558 718/1 |
| 2013/0232492 A1* | 9/2013 | Wang | .................... | H04L 1/2084 718/1 |

OTHER PUBLICATIONS

U.S. Appl. No. 13/844,711, filed May 15, 2013, 3 pages.
U.S. Appl. No. 13/844,711: Notice to File Missing Parts, dated May 15, 2013, 2 pages.
U.S. Appl. No. 13/844,711: Applicant Response to Pre Exam Formalities Notice, dated Jul. 16, 2013, 2 pages.
U.S. Appl. No. 13/844,711: filed Jul. 24, 2013, 3 pages.
U.S. Appl. No. 13/844,711: Notice of Publication, dated Sep. 18, 2014, 1 page.
U.S. Appl. No. 13/844,711: Non-Final Rejection, dated Dec. 15, 2014, 19 pages.
U.S. Appl. No. 13/844,711: Amendment/Req. Reconsideration—After Non-Final Reject, dated Mar. 16, 2015, 12 pages.
U.S. Appl. No. 13/844,711: Final Rejection, dated Apr. 7, 2015, 20 pages.
U.S. Appl. No. 13/844,711: After Final Consideration Program Decision, dated Jun. 22, 2015, 1 page.
U.S. Appl. No. 13/844,711: Advisory Action, dated Jun. 22, 2015, 2 pages.
U.S. Appl. No. 13/844,711: RCE and Amendments, dated Jul. 9, 2015, 15 pages.
U.S. Appl. No. 13/844,711: Non-Final Rejection, dated Aug. 24, 2015, 16 pages.
U.S. Appl. No. 13/844,711.
U.S. Appl. No. 13/844,711: Amendment/Req. Reconsideration—After Non-Final Reject, dated Nov. 24, 2015, 13 pages.
U.S. Appl. No. 13/844,711: Final Rejection, dated Dec. 7, 2015, 22 pages.
U.S. Appl. No. 13/844,711: After Final Consideration Program Request, dated Feb. 11, 2016, 7 pages.
U.S. Appl. No. 13/844,711: After Final Consideration Program Decision, dated Feb. 23, 2016, 1 page.
U.S. Appl. No. 13/844,711: Advisory Action, dated Feb. 23, 2016, 3 pages.
U.S. Appl. No. 13/844,711: RCE and Amendments, dated Apr. 4, 2016, 17 pages.
U.S. Appl. No. 13/844,711: Non-Final Rejection, dated Jun. 27, 2016, 23 pages.
U.S. Appl. No. 13/844,711: Amendment/Req. Reconsideration—After Non-Final Reject, dated Sep. 27, 2016, 19 pages.
U.S. Appl. No. 13/844,711: Final Rejection, dated Oct. 14, 2016, 23 pages.
U.S. Appl. No. 13/844,711: Response After Final Action, dated Jan. 17, 2017, 20 pages.
U.S. Appl. No. 13/844,711: Advisory Action, dated Mar. 10, 2017, 3 pages.
U.S. Appl. No. 13/844,711: RCE and Amendments, dated Mar. 14, 2017, 22 pages.
U.S. Appl. No. 13/844,711: Notice of Allowance and Fees Due, dated May 8, 2017, 12 pages.
U.S. Appl. No. 13/844,711: Corrected ADS Form, Jul. 20, 2017, 7 pages.
U.S. Appl. No. 13/844,711: Application Data Sheet to update/correct info, Aug. 4, 2017, 10 pages.
U.S. Appl. No. 13/844,711: Issue Fee Payment, Aug. 7, 2017, 1 page.
U.S. Appl. No. 13/844,711: Filing Receipt, Aug. 8, 2017, 3 pages.

* cited by examiner

ACTIVITY INITIATED VIRTUAL MACHINE MIGRATION

BACKGROUND

1. Field

This disclosure relates to migrating virtual machines, which may result, for example, from detecting a change in activity of a virtual machine.

2. Information

With the introduction of "virtual machines" in the cloud-computing landscape, computer processes, such as e-commerce, analysis, document storage and retrieval, and other applications, may be performed without the use of dedicated computer hardware. In many instances, this may allow a user to access computing resources without incurring costs associated with purchasing, for example, servers, storage facilities, backup drives, and so forth. In some scenarios, a user may be able to configure virtual machines in a manner that permits a user to decrease and/or increase computing resources at various times throughout the year. For example, a user operating an e-commerce website may make use of considerable computing resources during a particular "busy season" and may not have a need for significant computing resources at other times during the year. Thus, an operator of an e-commerce website may rent or lease computing resources during a busy season, for example, and may not have a need for those computing resources at other times during the year. During other times of the year, computing resources may be utilized by other users, such as operators of other websites, for example, who may employ the computing resources for different purposes.

However, transitioning a virtual machine from a higher demand state to a lower demand state may be difficult to accomplish without impacting services provided by the virtual machine. Thus, to ensure that a high level of service can be maintained, significant computing resources may be allocated to a user at times, for example, when only nominal computing resources may be needed. Computing resources that have been allocated to a user, but that remain idle, may represent waste and unnecessary costs to users, for example, as well as to providers of computing resources.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Figure 1:
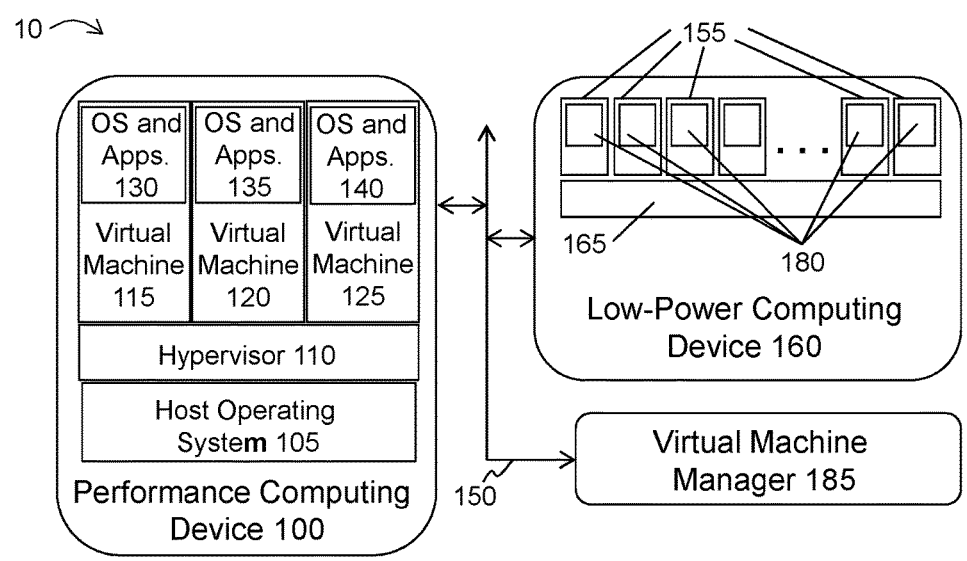
FIG. 1 is a schematic diagram of a system for activity initiated virtual machine migration according to an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

Likewise, in this context, the terms "coupled", "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless cooperate or interact. The term coupled may also be understood to mean indirectly connected, for example, in an appropriate context.

The terms, "and," "or," "and/or," or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. Though, it should be noted that this is merely an illustrative example and claimed subject matter is not limited to this example. Again, particular context of description or usage may provide helpful guidance regarding inferences to be drawn.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, and/or similar terms are used interchangeably. Similarly, the terms client, client device, client computing device, and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

A computing device may execute an operating system which may embody a collection of computer implemented instructions that manage computer hardware resources, such as processing, memory storage and retrieval, responding to user-initiated queries, control of external devices, and so forth. Application programs, which may include website hosting, online video gaming, analysis, document production, etc., may be executed on a computing device within an operating system. An operating system may perform an intermediary function between application programs and computing device hardware entities using common services defined by an operating system. Thus, in particular embodiments, an application program may access a peripheral device, such as a printer, external memory device, input device, and so forth, by invoking one or more functions of an operating system without, for example, interfacing directly with lower-level drivers and/or controllers, An operating system may schedule access to one or more processing units of a computing device so that multiple application programs may be executed by a computing device.

In this context, a virtual machine may refer to an organization of computer-implemented instructions, which may execute within an operating system of a host computing device. In some embodiments, at least some of which are described herein, a virtual machine may perform in a manner that, at least to some extent, approximates an actual, physical computing device. Thus, in some embodiments, an application program, executing within a guest operating system of a virtual machine, may function in a manner identical to a manner in which the application program functions within a host operating system of an actual, physical computing device. Accordingly, in various non-limiting embodiments, a virtual machine may imitate a hardware environment of a computing device such that at least portions of an application program executing within a guest operating system may be unable to distinguish a virtual machine from an actual, physical computing device. Thus, in some embodiments, services and/or devices presented by a virtual machine may behave in a manner that accords with actual printer drivers, and/or other hardware, software, firmware entities, for example.

In some embodiments, multiple virtual machines may be accommodated by a host operating system of a computing device. In embodiments, an operating system of a computing device may perform a supervisory function that controls, for example, access to peripherals that may be coupled to a computing device, such as network interfaces, printers, memory devices, and so forth. Supervisory functions may also include reducing or eliminating incidences of two or more virtual machines interfering with one another. In certain other embodiments, a supervisory function may execute separately from an operating system, for example, in a manner that permits multiple separate and isolated instances of an operating system to execute on a computing device. It should be noted that claimed subject matter is intended to embrace all such operating system functionality that allows one or more virtual machines to execute on a computing device.

As described herein, a virtual machine may be migrated from, for example, a first computing device to a second computing device by way of a live migration process. Migration, such as live migration, may be in response to, for example, detecting a decrease in activity performed by a virtual machine. In one possible example just to illustrate, if activity performed by a virtual machine approaches a threshold of 5.0%, for example, of allocated capacity, an operating system performing supervisory functions may select to perform live migration from a first computing device to a second computing device.

In embodiments, first and second computing devices may represent approximately identical computing devices, for example. However, a first computing device may be configured as a "performance" computing device in which a relatively small number of virtual machines are hosted. Accordingly, in embodiments, a performance computing device may perform, for example, a relatively large number of operations, such as e-commerce transactions, in a short period. In contrast, a second computing device may be configured as a "low-power" computing device wherein computing resources may be shared among a large number of virtual machines. Thus, individual virtual machines hosted on a low-power computing device may be capable of processing a relatively small number of transactions in a short period, for example. If, however, increased activity is detected on a virtual machine hosted on a low-power computing device, a virtual machine may be migrated, by way of live migration for example, to a performance computing device. In this manner, computing resources may be dynamically and efficiently allocated to virtual machines based, at least in part, on a level of activity of a virtual machine.

Live migration of a virtual machine may take place through a computer network, for example. In this context, the term "network device" refers to any device capable of communicating via and/or as part of a network. Network devices may be capable of sending and/or receiving signals (e.g., signal packets), such as via a wired or wireless network, and may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like, or any combination thereof.

FIG. 1 is a schematic diagram of a system for activity initiated virtual machine migration according to an embodiment 10. In FIG. 1, performance computing device 100 represents a computing device configured to host relatively small numbers (e.g., three) virtual machines, such as virtual machines 115, 120, and 125. Virtual machines 115, 120, and 125 may interact with hardware, software, and/or firmware resources of performance computing device 100 by way of host operating system 105, for example. Virtual machines 115, 120, and 125 may host one or more applications and a guest operating system, such as operating system and applications (OS and Apps.) 130, 135, and 140. In one example among many, just for illustration, virtual machine 115 may host, for example, several websites that function within a guest Linux operating system.

In the embodiment of FIG. 1, host operating system 105 may be configured to accommodate a number of virtual machines as instructed to do so by, for example, virtual machine manager 185. Virtual machine manager 185 may be employed, at least in some embodiments, to configure computing devices to correspond to performance computing devices and/or to correspond to low-power computing devices, for example. Thus, for example, a virtual machine manager may instruct one or more host operating systems of a computing device, such as host operating system 105 of computing device 100, to accommodate any number of virtual machines. In one example, for nominally active virtual machines, a virtual machine manager may instruct a host operating system to accommodate a large number, for example 50, 100, or more nominally active virtual machines. In another example, for highly active virtual machines, virtual machine manager 185 may instruct host operating system 105 to accommodate a smaller number of virtual machines, such as, one virtual machine, two virtual machines, or other relatively small number of virtual machines. It should be noted, however, that at least in some embodiments, labeling and/or designation of a computing device as "low-power" or "performance" may result, at least in part, from determinations made by virtual machine manager 185. Accordingly, in FIG. 1, for example, designation of performance computing device 100 and low-power computing device 160 may be in response to designation made by virtual machine manager 185.

Low-power computing device 160 may represent computing resources used by virtual machines 155 which, for example, and host operating system and applications 180. As mentioned previously, low-power computing device 160 and performance computing device 100 may employ similar hardware, software, and/or firmware and may differ from one another only in a number of virtual machines accommodated by an operating system. For example, host operating system 165 of low-power computing device 160 may be configured to accommodate 50, 100, 500, or a greater number of virtual machines, at least some of which may be nominally active (e.g., approaching a lower activity threshold). Host operating system 105 of performance computing 100 may be configured to accommodate a lesser number of virtual machines, at least some of which may be particularly active (e.g., approaching an upper activity threshold).

In some embodiments, a virtual machine may be migrated from a performance computing device to a low-power computing device to realize a power savings of a threshold amount. In one non-limiting example, a virtual machine manager may migrate a virtual machine if an expected savings in electrical power, at least partially in response to a migration, approaches 50.0%. Expected savings of electrical power may be computed, for example, by estimating electrical power consumed by a performance computing device divided by a number of virtual machines hosted by a performance computing device. Thus, for the embodiment of FIG. 1, if performance computing device 100 hosts three virtual machines, low-power computing device 160 may host six virtual machines to realize an approximately 50.0% savings in electrical power per virtual machine. In other examples, a virtual machine manager may migrate a virtual machine if migration would result in an expected savings in electrical power approaching, for example, 90.0%. Thus, for the embodiment of FIG. 1, low-power computing device 160 may host 30 virtual machines. In other examples, a virtual machine manager may migrate a virtual machine if an expected power savings may be as little as approximately 5.0%, or approximately 10.0%, for example, or may migrate a virtual machine if an expected power savings may be at least approximately 95.0%, for example. It should be noted, however, that claimed subject matter is intended to embrace all instances of migration of virtual machines to computing devices designated as "low-power" by virtual machine manager 185.

In some embodiments, low-power computing device 160 and performance computing device 100 may represent differing hardware, software, and/or firmware configurations. For example, in addition to designation by virtual machine manager 185, performance computing device 100 may comprise multiple processors operating at relatively high speeds, substantial amounts of random access memory, wide address buses, level 2 cache memory, and so forth. Performance computing device 100 may comprise additional performance-enhancing features, and claimed subject matter is not limited in this regard. In contrast, low-power computing device 160 may comprise a single-processor architecture operating at a lower speed, for example, smaller amounts of random access memory, and so forth. Again, these are merely example characteristics, and claimed subject matter is not limited in this respect.

As will be explained in detail with regard to FIG. 2, virtual machine manager 185 may operate to manage computing resources, such as virtual machines, executing on performance computing device 100, low-power computing device 160, as well as additional performance and low-power computing devices, for example, communicating by way of a network 150. In certain embodiments, if host operating system 105 detects that activity among one or more of virtual machines 115, 120, and 125 approaches a lower threshold, host operating system 105 may report a decrease in activity to virtual machine manager 185. Responsive to a received report, virtual machine manager 185 may initiate live migration of a virtual machine from performance computing device 100 to low-power computing device 160. Virtual machine manager 185 may then communicate with host operating system 105 to initiate and/or manage a live migration process, for example, in which a virtual machine executing on performance computing device 100 may be migrated to low-power computing device 160.

In some embodiments, virtual machine manager 185 may perform one or more functions similar to those performed by a "hypervisor," for example. Accordingly, in at least some embodiments, virtual machine manager 185, though identified as a processing entity separate from performance computing device 100, may be integrated within a software architecture of performance computing device 100, for example and/or low-power computing device 160. In embodiments, virtual machine manager 185 may be positioned between host operating system 105 and virtual machines 115, 120, and 125, for example. A hypervisor may represent a relatively thin layer of executable code to achieve fine-grained, dynamic resource sharing of resources accessible to performance computing device 100 and or low-power computing device 160, for example. However, the use of a hypervisor represents but one example embodiment, and claimed subject matter is intended to embrace all embodiments of virtual managers, one or more of which may comprise a hypervisor.

If a virtual machine executes on low-power computing device 160, a virtual machine may be capable of performing activities, even though such activities may be performed at a reduced pace. For example, a virtual machine hosting a website specializing in Valentine's Day gifts may, for example, operate within the limitations of low-power computing device 160 for extended periods, such as from immediately after Valentine's Day until, for example, January of a following year. In another example, a virtual machine hosting a website specializing in winter clothing may be migrated to low-power computing device 160 in the spring and migrated to performance computing device 100 as the following winter approaches, such as in October, for example. During an intervening period, such as from March until October, for example, a virtual machine executing on low-power computing device 160 may continue to process transactions, albeit at a reduced pace.

Figure 2:
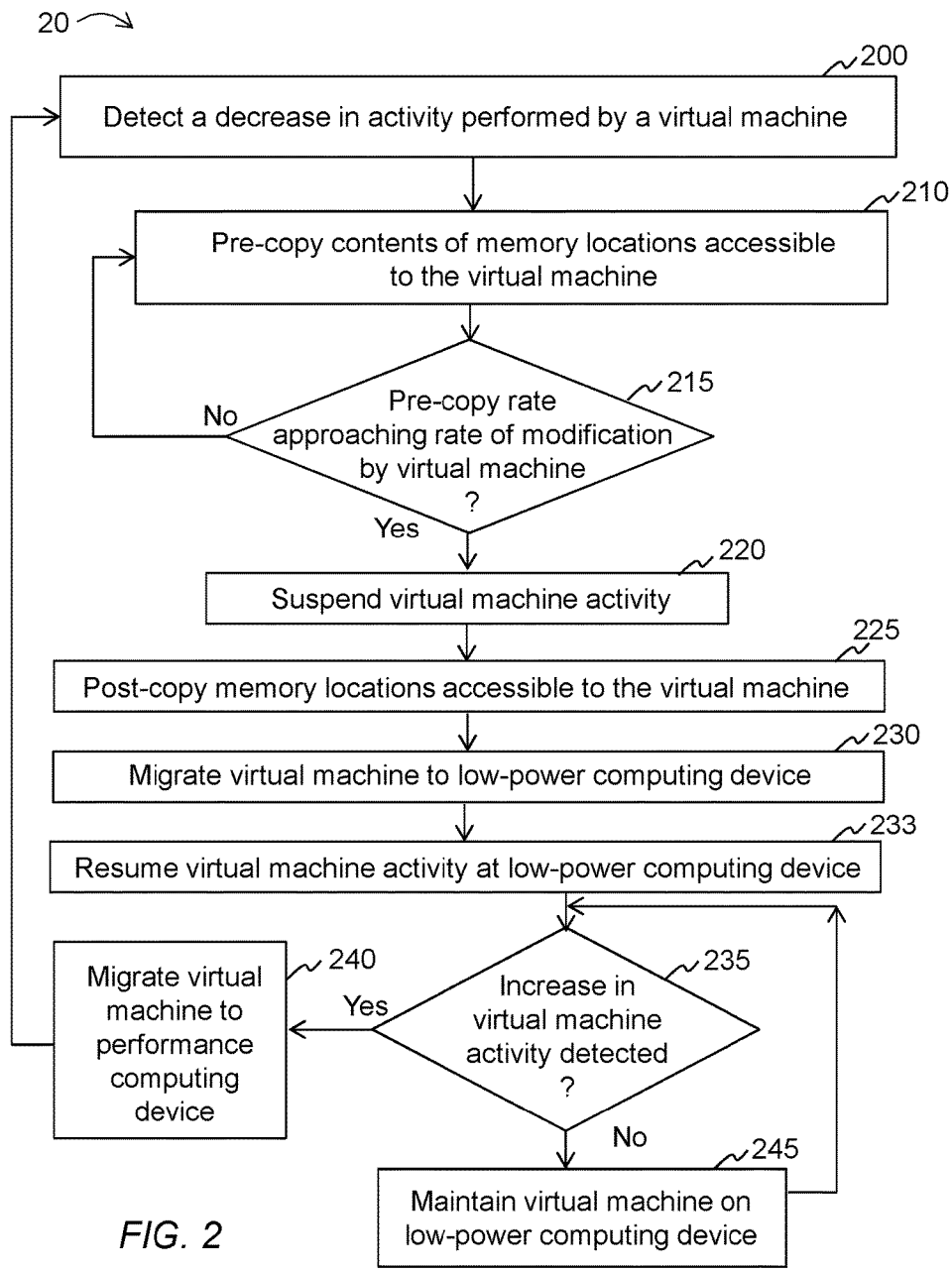
FIG. 2 is a flowchart for a method for activity initiated virtual machine migration according to an embodiment.

FIG. 2 is a flowchart for a method for activity initiated virtual machine migration according to an embodiment. Computing environment 30 of FIG. 3 may be suitable for performing the method of embodiment 20. However, claimed subject matter is not limited to the particular implementation of FIG. 3 and alternate arrangements of components in other implementations may be used. Example embodiments, such as embodiment 20 shown in FIG. 2 and others herein, may include blocks in addition to those shown and described, fewer blocks, blocks occurring in an order different than may be identified, or any combination thereof.

Embodiment 20 begins at 200, in which a virtual machine manager, for example, detects a decrease in activity performed by a virtual machine. In embodiments, this may suggest that a virtual machine may be migrated from a performance computing device to a low-power computing device. A decrease in activity may be detected by determining a decrease in message traffic, for example, between a network interface and an external device, such as by way of an interface to network 150 of FIG. 1. A decrease in activity may also comprise a decrease in a number of transactions processed in a given period, or as a result of a change in one or more other activity indicators. A decrease in activity may be detected by a mechanism internal to a performance computing device, such as a host operating system, a virtual machine, and/or by a process interacting with one or more of the host operating system and a virtual machine, just to name a few examples. In some embodiments, a decrease in activity may be detected by a virtual machine manager or other entity operating outside of a performance computing device, for example. Migration may, in some embodiments, at least in part, result in a savings in power consumed by a virtual machine.

If a decrease in activity performed by a virtual machine is detected, at 210 a process may be initiated to migrate, such as by way of live migration, a virtual machine to a low-power computing device. The process may begin with pre-copying contents of memory locations accessible to the virtual machine to a destination host, such as an area of memory under the control of, for example, one or more processors of a low-power computing device. A pre-copy operation may be designed to copy memory addresses organized into blocks and/or pages and may begin by copying memory locations not currently in use by a process executing on a virtual machine.

In at least one embodiment, a pre-copy process may continue until a rate at which pages are copied approaches a rate at which one or more processes executing on a virtual machine modifies pre-copied pages. Thus, in one possible example just to illustrate, a pre-copy process may initiate by copying pages at a rate of 1000 pages per second, for example. A pre-copying process may begin with memory pages that have not been modified by one or more processes executing on a virtual machine for a considerable period of time and may continue until pages recently modified by one or more processes are copied. A pre-copy process may be performed, for example, up to an approximate point at which a pre-copy rate approaches a rate at which pages are modified by one or more processes executing on a virtual machine. It should be noted, however, that a pre-copy process may be suspended at other times, and claimed subject matter is not limited in this regard.

At 215, if a pre-copy rate of memory locations (e.g., memory pages), approaches a rate at which memory locations (e.g., memory pages) are undergoing modification, such as by way of one or more processes executing on a virtual machine, activity of a virtual machine may be suspended, such as at 220. At 225, at least partially responsive to suspension of virtual machine activity, additional memory locations may be post-copied to a destination host such as, for example, a low-power computing device. At 230, migration of a virtual machine to a low-power computing device may be completed. In at least some embodiments, migration may entail obtaining a list of one or more recently executed instructions and/or a list of one or more next executed instructions. Accordingly, at 233, processes executing by the virtual machine may be resumed at a destination host, such as a low-power computing device. In embodiments, a live migration process, comprising pre-copying of memory locations, suspension of virtual machine process, post copying of remaining memory locations, and restart of virtual machine processes may transpire in a negligible period of time, such as 50.0 ms. However, in embodiments, a live migration process may consume larger periods, such as 100.0 ms, 1.0 second, and so forth, or a consume smaller periods, such as 25.0 ms 10.0 ms, and so forth, and claimed subject matter is not limited in this regard.

At 235, a virtual machine may execute at a destination host, such as a low-power computing device, for an indefinite time period. In embodiments, a virtual machine may execute at a destination host for time periods ranging from a few minutes to a few hours, for example. In other embodiments, a virtual machine may execute at a destination host for days or weeks, and there is no upper or lower limit to a period of time that a virtual machine may be hosted by a destination. Thus, 245 may represent operation of a virtual machine on a low-power computing device for any advantageous and/or convenient length of time without limitation.

At 240, in the event that an increase in virtual machine activity is detected, such as an increase in transactions processed by a virtual machine, Internet message traffic to and/or from a virtual machine, or other activity indicator, a virtual machine may be migrated from a low-power computing device to a performance computing device. In an embodiment, 240 may comprise actions similar to 210, 215, 220, 225, 230, and 233, with the exception that, for example, live migration may proceed from a low-power computing device to a performance computing device. In particular, 240 may comprise pre-copying contents of memory locations accessible to a virtual machine operating on a low-power computing platform, similar to 210. If a pre-copy rate approaches a rate of modification by a virtual machine, similar to 215, virtual machine activity operating on a low-power computing platform may be suspended, similar to 220. Memory locations accessible to a virtual machine operating on a low-power computing platform may be post-copied, similar to 225. Responsive to pre-copying and post copying, for example, a virtual machine may be migrated to a performance computing device, and activity may be resumed at a performance computing device, similar to 230 and 233 A virtual machine may execute on a performance computing machine until a decrease in activity performed by a virtual machine is detected, such as at 200.

Figure 3:
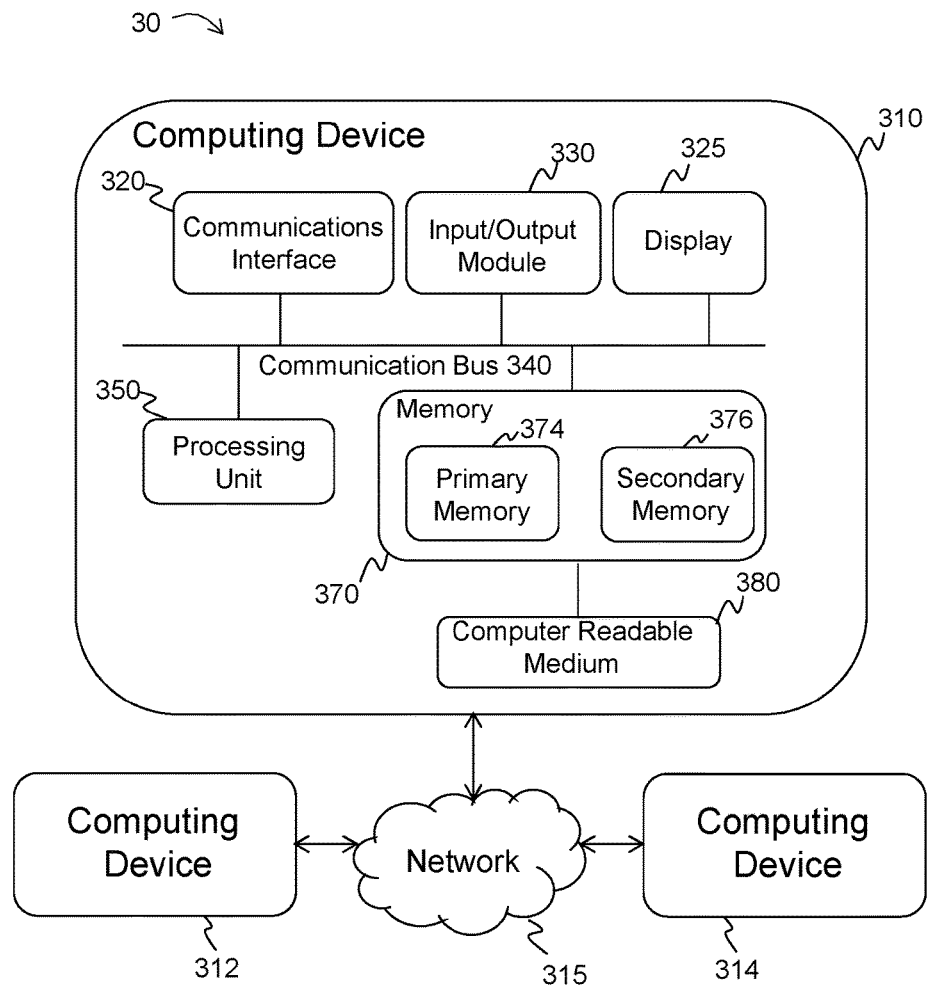
FIG. 3 is a schematic diagram of a computing device that may be employed to implement activity initiated virtual machine migration according to an embodiment.

FIG. 3 is a schematic diagram of a computing device that may be employed to implement activity initiated virtual machine migration according to an embodiment. For purposes of illustration, FIG. 3 is an illustration of an embodiment of a computing device 310 that may be employed as a performance computing device, a low-power computing device, or a virtual machine manager. In FIG. 3, network 315 may interface with computing device 310, 312, and 314, and may comprise features of a conventional network, for example. Within computing device 310, communications interface 320, processor (e.g., processing unit) 350, and memory 370, which may comprise primary memory 374 and secondary memory 376, may communicate by way of communication bus 340, for example. In FIG. 3, computing device 310 may execute a host operating system capable of accommodating a number of virtual machines that may perform web-hosting, e-commerce, banking, document management, analysis, and many other functions without limitation in the form of communicating electronic signals among modules of computing device 310, for example. Although the computing device of FIG. 3 shows the above-identified components, claimed subject matter is not limited to computing devices having only these components as other implementations may include alternative arrangements that may comprise additional components, fewer components, or components that function differently while achieving similar results. Rather, examples are provided merely as illustrations. It is not intended that claimed subject matter to limited in scope to illustrative examples.

Processor 350 may be representative of one or more circuits, such as digital circuits, to perform at least a portion of a computing procedure or process. By way of example but not limitation, processor 350 may comprise one or more processors, such as controllers, microprocessors, microcontrollers, application specific integrated circuits, digital signal processors, programmable logic devices, field programmable gate arrays, and the like, or any combination thereof. In implementations, processor 350 may perform signal processing to manipulate signals or states or to construct signals or states, for example.

Memory 370 may be representative of any storage mechanism. Memory 470 may comprise, for example, primary memory 374 and secondary memory 376, additional memory circuits, mechanisms, or combinations thereof may be used. Memory 370 may comprise, for example, random access memory, read only memory, or one or more data storage devices or systems, such as, for example, a disk drive, an optical disc drive, a tape drive, a solid-state memory drive, just to name a few examples. Memory 370 may be utilized to store a program, as an example. Memory 370 may also comprise a memory controller for accessing computer readable-medium 380 that may carry and/or make accessible content, code, and/or instructions, for example, executable by processor 350 or some other controller or processor capable of executing instructions, for example.

Under the direction of processor 350, memory, such as cells storing physical states, representing for example, a program, may be executed by processor 350 and generated signals may be transmitted via the Internet, for example. Processor 350 may also receive digitally-encoded signals from one or more of computing devices 312, and 314 by way of a network 315. Network 315 may comprise one or more communication links, processes, and/or resources to support exchanging communication signals between a client and server, which may, for example, comprise one or more servers (not shown). By way of example, but not limitation, network 315 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing device," as used herein, refers to a system that includes a capability to process and/or store data in the form of signals and/or states. Thus, a computing device, in this context, may comprise hardware, software, firmware, or any combination thereof (other than software per se). Computing device 310, as depicted in FIG. 3, is merely one such example, and the scope of claimed subject matter is not limited to this particular example. For one or more embodiments, a computing device may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 370 may store cookies relating to one or more users and may also comprise a computer-readable medium that may carry and/or make accessible content, code and/or instructions, for example, executable by processor 350 or some other controller or processor capable of executing instructions, for example. A user may make use of an input device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may also execute a variety of operating systems for hosting virtual machines, such as Virtual PC 2004, Virtual PC 2007, and Windows Virtual PC. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing device, or other system, for example, that may result in an embodiment of a method in accordance with claimed subject matter being executed, such as a previously described embodiment, for example; although, of course, claimed subject matter is not limited to previously described embodiments. As one potential example, a computing device may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

The invention claimed is:

1. A method comprising:
   issuing a first set of at least one executable instruction to a first host operating system of a first computing device to operate as a low-power computing device;
   issuing a second set of at least one executable instruction to a second host operating system of a second computing device to operate as a performance computing device;
   wherein the low-power computing device and the performance computing device have substantially the same hardware characteristics;
   determining that an activity level of one or more virtual machines hosted on the first host operating system of the first computing device exceeds a first threshold; and
   migrating, to the second computing device, the one or more virtual machines having the activity level that has exceeded the threshold.

2. The method of claim 1 wherein the migrating comprises live migration.

3. The method of claim 2 wherein the live migration further comprises:
   pre-copying contents of a first plurality of memory locations from a plurality of memory locations accessible to the one or more virtual machines in which the activity level has exceeded the first threshold;
   suspending the activity performed by the one or more virtual machines in which the activity level has exceeded the first threshold; and
   post-copying, after the suspending, contents of a second plurality of memory locations from the plurality of memory locations accessible to the one or more virtual machines having the activity level that has exceeded the threshold.

4. The method of claim 3, wherein the execution of the first set of at least one executable instruction issued to the first operating system further determines a number of virtual machines to be hosted by the first operating system, and wherein the execution of the second set of at least one executable instruction issued to the second operating system further determines a number of virtual machines to be hosted by the second operating system; and
   wherein the number of virtual machines to be hosted by the second operating system is less than the number of virtual machines to be hosted by the first operating system.

5. The method of claim 1, wherein the first computing device comprises hardware characteristics substantially identical to the hardware characteristics of the second computing device.

6. The method of claim 1, wherein the first computing device and the second computing device comprise different hardware characteristics.

7. The method of claim 1 further comprising:
   determining that an activity level of one or more virtual machines hosted on the second host operating system of the second computing device has reached a second threshold; and
   migrating, to the first computing device, the one or more virtual machines that has reached the second threshold.

8. A system comprising:
   a virtual machine manager; and
   a first computing device and a second computing device, the first computing device comprising a first host operating system, the second computing device comprising a second host operating system, the virtual machine manager to issue a first set of one or more executable instructions to the first operating system of the first computing device to operate as a performance computing device and to issue a second set of one or more executable instructions to the second operating system of the second computing device to operate as a low-power computing device,
   wherein the low-power computing device and the performance computing device have substantially the same hardware characteristics,
   wherein the virtual machine manager is to detect a decrease in activity level of one or more virtual machines to be hosted on the first host operating system of the first computing device and to migrate, to the second computing device, the one or more virtual machines in which the decrease in the activity level has been detected.

9. The system of claim 8 wherein the virtual machine manager is further to perform live migration of the one or more virtual machines in which the decrease in the activity level has been detected to the second computing device.

10. The system of claim 9 wherein the live migration is to further comprise:
    the virtual machine manager to:

pre-copy contents of a first plurality of memory locations from a plurality of memory locations accessible to the one or more virtual machines in which the decrease in the activity level has been detected;

suspend the activity performed by the one or more virtual machines in which the decrease in the activity level has been detected; and post-copy, after the suspending, contents of a second plurality of memory locations from the plurality of memory locations accessible to the one or more virtual machines in which the decrease in the activity level has been detected.

11. The system of claim 8, wherein the virtual machine manager is further to determine a number of virtual machines to be hosted by the first operating system, and to determine a number of virtual machines to be hosted by the second operating system; and wherein the number of virtual machines to be hosted by the second operating system is to be less than the number of virtual machines to be hosted by the first operating system.

12. The system of claim 8, wherein the first computing device is to comprise hardware characteristics different from the second computing device.

13. The system of claim 8, wherein the virtual machine manager is to detect an increase in an activity level of one or more virtual machines to be hosted on the second host operating system of the second computing device and to responsively migrate, to the first computing device, the one or more virtual machines in which the decrease in the activity level has been detected.

14. An article comprising:

a non-transitory storage medium comprising executable computer instructions stored thereon executable by at least one processor in communication with at least one memory, the computer instructions to be fetched from the at least one memory for execution on the at least one processor, the fetched computer instructions to be executed on the at least one processor to comprise computer instructions to manage one or more virtual machines hosted on a first computing device and computer instructions to manage one or more virtual machines hosted on a second computing device, execution of the virtual machine management instructions to:

determine a first set of operating parameters for a first set of one or more virtual machines and to determine a second set of operating parameters for a second set of one or more virtual machines, a first operating system to operate on the first computing device as a performance computing device and a second operating system to operate on the second computing device as a low-power computing device, wherein the performance computing device and the low-power computing device have substantially the same hardware characteristics; and detect a decrease in an activity level of one or more virtual machines to be hosted on a first host operating system of the first computing device and to migrate, responsive to the detection, to the second computing device, the one or more virtual machines in which the decrease in the activity level has been detected.

15. The article of claim 14, the execution of the virtual machine management instructions stored thereon to further perform live migration, to the second computing device, of the one or more virtual machines in which the decrease in the activity level has been detected.

16. The article of claim 15, the live migration to comprise the execution of the virtual machine management instructions stored thereon further to:

pre-copy contents of a first plurality of memory locations from a plurality of memory locations accessible to the one or more virtual machines in which the decrease in the activity level has been detected;

suspend the activity performed by the one or more virtual machines in which the decrease in the activity level has been detected; and post-copy, after the suspending, contents of a second plurality of memory locations from the plurality of memory locations accessible to the one or more virtual machines in which the decrease in the activity level has been detected.

17. The article of claim 15, the execution of the virtual machine management instructions stored thereon further to determine a number of virtual machines to be hosted by the first operating system and to determine a number of virtual machines to be hosted by the second operating system; and wherein the number of virtual machines to be hosted by the second operating system is to be less than the number of virtual machines to be hosted by the first operating system.

18. The article of claim 15, wherein the first computing device is to comprise hardware characteristics different than the hardware characteristics of the second computing device.

19. The article of claim 15, wherein the first computing device is to comprise hardware substantially identical to the hardware characteristics of the second computing device.

20. The article of claim 15, execution of the virtual machine management instructions stored thereon further to:

detect an increase in an activity level of one or more virtual machines to be hosted on the first host operating system of the first computing device and to migrate, responsive to the detected increase in the activity level, to the second computing device, one or more virtual machines in which the increase in the activity level has been detected.

\* \* \* \* \*